(12) United States Patent
Ben-Yaakov (10) Patent No.: US 6,737,846 B1
(45) Date of Patent: May 18, 2004

(54) METHOD AND VOLTAGE FEEDBACK CIRCUITRY FOR IMPROVING THE PERFORMANCE OF APFC CONVERTERS

(75) Inventor: Shmuel Ben-Yaakov, Beer-Sheva (IL)

(73) Assignee: Green Power Technologies Ltd., Rehovot (IL)

(*) Notice: Subject to any disclaimer, the term of this patent is extended or adjusted under 35 U.S.C. 154(b) by 0 days.

(21) Appl. No.: 10/320,985

(22) Filed: Dec. 17, 2002

(51) Int. Cl.$^7$ ................................................ G05F 1/70
(52) U.S. Cl. ........................ 323/284; 323/282; 323/222
(58) Field of Search ............................... 323/282, 284, 323/285, 222; 363/89

(56) References Cited

U.S. PATENT DOCUMENTS

| | | | | |
|---|---|---|---|---|
| 5,434,767 A | * | 7/1995 | Batarseh et al. | ............... 363/16 |
| 5,515,261 A | * | 5/1996 | Bogdan | ........................ 363/89 |
| 5,602,463 A | * | 2/1997 | Bendall et al. | ............. 323/266 |
| 5,636,106 A | * | 6/1997 | Batarseh et al. | ............... 363/16 |
| 5,818,707 A | * | 10/1998 | Seong et al. | .................. 363/89 |
| 5,960,207 A | * | 9/1999 | Brown | ....................... 713/300 |
| 6,307,361 B1 | * | 10/2001 | Yaakov et al. | .............. 323/288 |
| 6,385,057 B1 | * | 5/2002 | Barron | ........................ 363/17 |
| 6,445,600 B2 | * | 9/2002 | Ben-Yaakov | ................. 363/39 |
| 6,570,366 B1 | * | 5/2003 | Lin et al. | .................... 323/207 |

* cited by examiner

Primary Examiner—Bao Q. Vu
(74) Attorney, Agent, or Firm—Cooper & Dunham LLP (57) ABSTRACT

An Active Power Factor Correction (APFC) apparatus having improved output voltage regulation, for switching a power supply fed by an array of rectifying diodes and consisting of at least an input inductor, a contact of which is connected in series with a contact of the array, and of a controllable power switch connected in tandem with the array and the input inductor, that comprises a) sampling circuitry, for sampling the instantaneous value of the output voltage; b) control circuitry, for controlling the switching time of the controllable switch in response to an error signal, and, thereby, causing the instantaneous value to be essentially similar to a predetermined nominal value; c) amplifier circuitry, for generating the error signal, the amplifier circuitry having at least a reference input connected to a reference signal, being determined according to the nominal value and sampling circuitry, and an input, to which an input signal is provided, the error signal represents the deviation of the input signal from the reference signal, the input signal being associated with the sampled instantaneous value; and d) circuitry for providing a low-pass filtered first indication signal to the input, whenever the deviation, of the output signal, of the sampling circuitry, from the reference signal, does not exceed a predetermined value, or otherwise, for providing a second indication signal to the amplifier circuitry whenever the deviation exceeds the predetermined value, the second indication signal being related to higher deviation values.

15 Claims, 8 Drawing Sheets

METHOD AND VOLTAGE FEEDBACK CIRCUITRY FOR IMPROVING THE PERFORMANCE OF APFC CONVERTERS

FIELD OF THE INVENTION

The present invention relates to the field of switching power converters. More particularly, the present invention relates to a method and circuitry for improving the output voltage regulation of switching power converters.

BACKGROUND OF THE INVENTION

Figure 1:
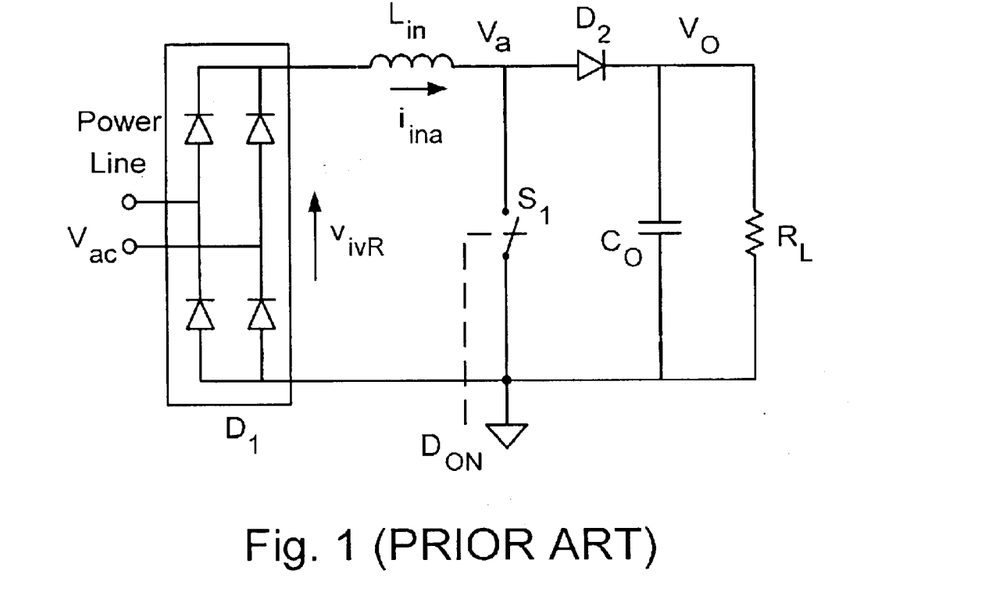
FIG. 1 illustrates a PWM Boost converter (prior art)

Currently there are several types of converters, which are widely used for DC-to-DC, DC-to-AC, AC-to-DC and AC-to-AC power conversion. In some applications, the purpose of the power conversion schemes is to shape the input current seen at the input of the converter in order to correct power factor. For example, in a power converter known in the art as an Active Power Factor Correction (APFC) converter, the role of the converter is to ensure that the current drawn from the AC power line is in phase with the line voltage with minimum high-order harmonics. A typical and well-known implementation of an APFC converter is illustrated in FIG. 1 (prior art). In FIG. 1, input voltage $V_{ac}$ is rectified by diode bridge $D_1$ and fed to a Boost converter that comprises input inductor $L_{in}$, switch $S_1$, high frequency rectifier $D_2$, output filter capacitor $C_O$ and load $R_L$. Power switch $S_1$ is driven by a high frequency control signal having duty cycle $D_{ON}$ so as to force input current $i^{ina}$ to follow the shape of rectified input voltage $V_{ivR}$, in which case the power converter becomes essentially a resistive load to the ac power line; i.e., the Power Factor (PF) is unity.

The growing use of APFC converters is driven by the concern for the quality of AC power line supplies. Injection of high harmonics into the power line, and poor Power Factor (PF) in general, is known to cause many problems. Among these are the lower efficiency of power transmission, possible interference to other electrical units connected to the (same) power line and distorted shape of the line voltage. In the light of the practical importance of APFC converters, many countries have adopted, or are in the process of adopting, voluntary and mandatory standard and statutes, which set limits to the permissible current line harmonics injected by any given electrical equipment powered by the AC mains, in order to maintain a relatively high power-quality. Another advantage of an APFC converter is that it allows a better exploitation of the power level that is drawn from a given AC power line. Without Power Factor Correction, the current drawn from AC power line comprises a relatively high level of unwanted harmonics, which may be higher than the magnitude of the first harmonics of the current, the latter being the only component that contributes a real power to the load. Additionally, protection elements, such as fuses and circuit breakers, respond to the rms value of the current passing through them. Consequently, the rms value of the current limits the maximum power that can be drawn from the line. In Power Factor Correction equipment the rms current essentially equals the magnitude of the first harmonics of the current (due to lacking higher harmonics) and, hence, the power drawn from the line essentially reaches the maximum theoretical value. It is thus evident that the need for APFC circuits is widespread and that economical implementation of such circuits is of prime importance. Cost is of great concern considering the fact that the APFC is an add-on expense to the functionality of the original equipment in which the APFC converter is included.

Figure 2:
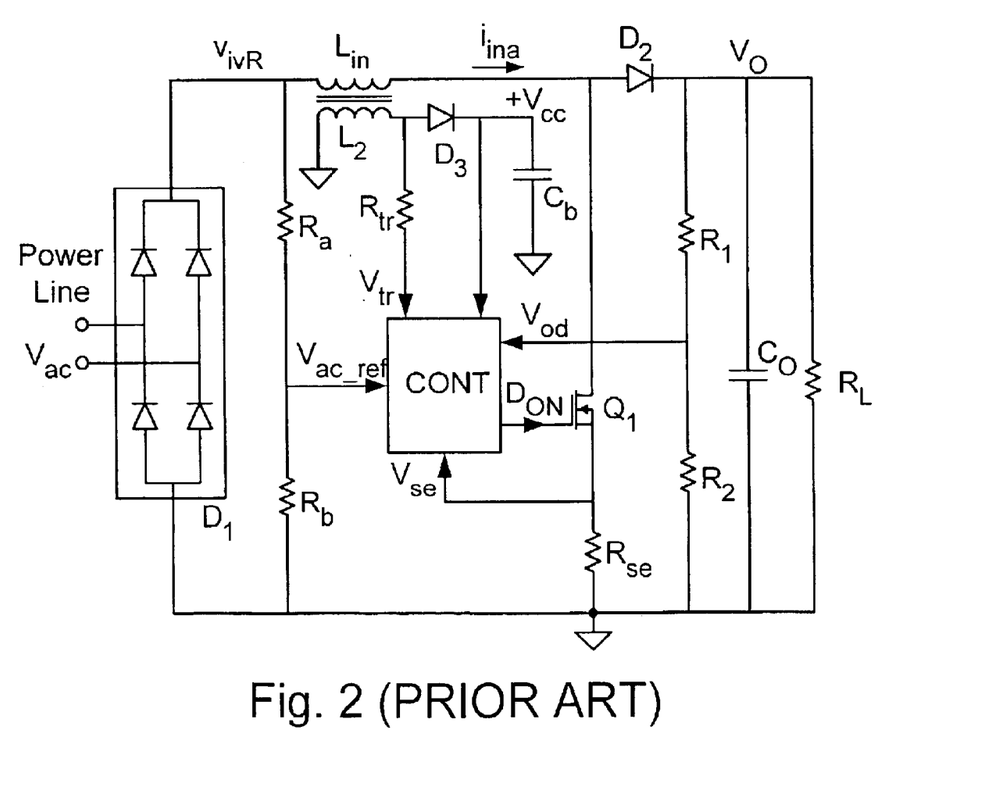
FIG. 2 illustrates a typical construction of an APFC converter (prior art)

Common APFC circuits operate in closed feedback configuration. For example, in the circuit illustrated in FIG. 2 (prior art) the controller CONT samples the shape of the rectified power line voltage $V_{ivR}$ by voltage utilizing $V_{ac\_ref}$, which is obtained by voltage divider $R_a, R_b$. Namely, $V_{ac\_ref}$ is used as the reference voltage for the desired shape of the input current. Controller CONT accepts also voltage $V_{se}$, which is measured across $R_{se}$ and is identical to the input current when power switch $Q_1$ is on. Accordingly, controller CONT generates pulses $D_{ON}$ in order to drive power switch $Q_1$ such as to force inductor current $i_{ina}$ to follow reference voltage shape $V_{ac\_ref}$. Current level is adjusted for any given load $R_L$ by monitoring output voltage $V_O$ by voltage divider $R_1, R_2$, and multiplying the reference signal $V_{ac\_ref}$ by a factor that is correlated to the deviation from the desired output voltage level so as to adjust the effective reference signal to the load.

Figure 3:
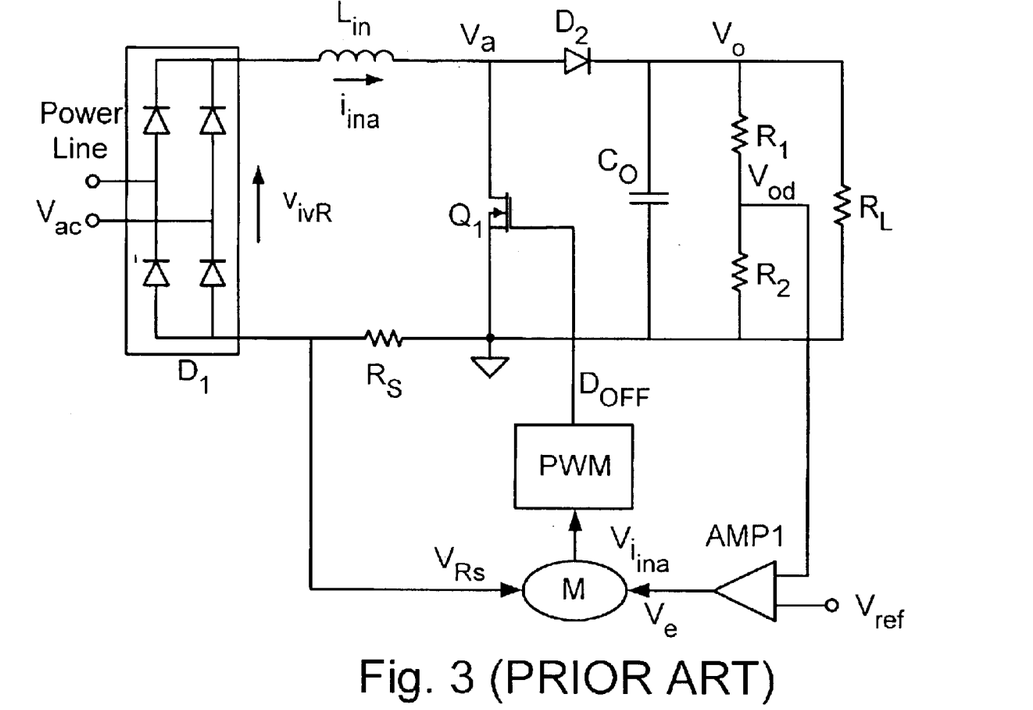
FIG. 3 illustrates an APFC controller implementation without sensing the input voltage (prior art)

FIG. 3 (prior art) illustrates an improved construction of APFC converters, the improvement of which is obtained by applying a modified control strategy that does not require sensing the input voltage. In FIG. 3, $V_a$ is a cyclic pulsating voltage having maximal magnitude $V_O$ and duration $T_{OFF}$, whenever $Q_1$ is in its non-conducting state. Consequently, the average value of $V_a$ is:

$$v_a = \frac{V_o T_{OFF}}{T_S} \quad (1)$$

wherein $T_S$ is the PWM switching period.
Or:

$$V_a = V_o D_{OFF} \quad (2)$$

wherein $$D_{OFF} = \frac{T_{OFF}}{T_S} \quad (3)$$

Similarly, whenever $Q_1$ is in its conducting state (i.e. during $T_{ON}$), $D_{ON}$ is defined as:

$$D_{ON} = \frac{T_{ON}}{T_S} \quad (4)$$

The input voltage ($V_{ivR}$) fed to the Boost converter is assumed to be of low frequency comparing to the switching frequency $f_s(f_s=1/T_S)$ and, hence, can be considered constant at least one switching period $T_S$. Assuming proper functioning of the power converter, the average low frequency voltage across $L_{in}$ is essentially zero (or else the current will increase to very high magnitudes). This implies:

$$v_{ivR} = v_{av} \quad (5)$$

wherein $V_{ivR}$ is the instantaneous low frequency component of $V_{ivR}$. From (1):

$$v_{ivR} = V_o D_{OFF} \quad (6)$$

If DOFF is programmed according to the rule specified in equation (7):

$$D_{OFF} = N i_{ina} \quad (7)$$

wherein. N is a constant and $i_{ina}$ is the low frequency component of the input current ($i_{ina}$), then:

$$v_{ivR} = V_o N i_{ina} \quad (8)$$

or:

$$i_{ina} = \frac{V_{ivR}}{v_o N} \quad (9)$$

Since $C_O$ is chosen to be adequately large, $V_O$ may be practically considered constant (i.e. the ripple of $V_O$ can be neglected). Therefore, according to (9), input current $i_{ina}$ follows input voltage $V_{ivR}$. Consequently, the Power Converter looks resistive to the AC power source with an apparent input resistance ($R_e$):

$$R_e = NV_o \quad (10)$$

which implies that N controls the input resistance $R_e$:

$$N = \frac{R_e}{V_o} \quad (11)$$

The value of the input resistance and hence the input current can thus be controlled by varying N. In practical applications, $V_o$ needs to be maintained constant even if the load ($R_L$) varies. In the control scheme depicted in FIG. 3, the output voltage is maintained constant by closing a feedback loop on N, which can be expressed as:

$$N = R_s V_e K_{PWM} \quad (12)$$

wherein $K_{PWM}$ is a constant.

If $V_{od}$ (FIG. 3) deviates (in accordance with deviations in $V_o$), from a predetermined value, as set by reference voltage $V_{ref}$, error signal $V_e$ will adjust N so as to match $R_e$ to the power requirement of (new/changed) load $R_L$.

A major problem with the voltage feedback scheme discussed above (which is common to all prior art APFC systems, is the presence of ripple in $V_e$, which results from the pulsating current that is fed into the bulk capacitor $C_o$ through the APFC system. The ripple component on $V_e$ regulates N and hence $T_{OFF}$, thereby distorting $i_{ina}$. This problem could be overcome by extra filtering, e.g., by adding a large capacitor in parallel to $R_2$. However, in this kind of solution output voltage $V_o$ will respond with severe voltage overshoots and undershoots to load changes since the system will be too slow in correcting N. Such a behavior could be dangerous as the voltage may exceed the acceptable and safe operating voltage range of the system.

Therefore, it is desirable to have APFC controllers that have the capacity to respond quickly to changes in their load without adding undesirable harmonics to the current. It is also desirable that the output signal of the voltage error amplifier in APFC controllers will be filtered, and will change rapidly whenever the voltage across the load exceeds predetermined values.

It is an object of the present invention to provide circuitry for improving the output voltage regulation of switching power converters.

It is another object of the present invention to provide circuitry for improving the output voltage regulation of switching power converters, which is fast reacting to changes in the load.

It is another object of the present invention to provide circuitry for improving the output voltage regulation of switching power converters, in which undesired switching harmonics are filtered out from the correction circuitry.

Other objects and advantages of the invention will become apparent as the description proceeds.

SUMMARY OF THE INVENTION

The present invention is directed to a method for allowing to conditionally changing the voltage feedback to an error amplifier contained within APFC converter, thereby allowing the APFC converter to respond quickly to large load changes while keeping low ripple content. An APFC employing this method has small voltage overshoots and undershoots in response to rapid load changes, and has low distorted input current. The present invention is also directed to a method for filtering out, from the APFC converter, undesired switching harmonics.

Accordingly, the present invention is characterized by utilizing a non-linear feedback circuit configuration that employs a predetermined voltage 'window', or 'gap'. As long as the magnitude of the output voltage of the APFC is contained within the predetermined window/gap, a voltage signal representative of the APFC output voltage is 'heavily' low-pass filtered (i.e. by employing a filter with long time-constant) before being delivered to an input terminal of an error amplifier that is associated with the correction circuit. Consequently, the output signal of the error amplifier will have very low ripple content. However, whenever the magnitude of the output voltage of the APFC exceeds the predefined window/gap, the voltage signal representing the APFC output voltage is only 'lightly' filtered, so as to allow the APFC to quickly respond to the drastic change(s) in the output condition(s).

The present invention discloses an Active Power Factor Correction (APFC) apparatus, which has an improved output voltage regulation (i.e., in relation to prior art APFCs), for switching power supply that is fed by an array of rectifying diodes and consisting of at least an input inductor, a contact of which is connected in series with a contact of the array, and of a controllable power switch connected in tandem with the array and the input inductor.

Preferably, the APFC comprises:

a) sampling circuitry, for sampling the instantaneous value of the output voltage;

b) control circuitry, for controlling the switching time of the controllable switch in response to an error signal, and, thereby, causing the instantaneous value to be essentially similar to a predetermined nominal value;

c) amplifier circuitry, for generating the error signal. The amplifier circuitry has at least a reference input, which is connected to a reference signal that is determined according to the nominal value and sampling circuitry. The amplifier circuitry also has an input, to which an input signal could be provided. The error signal represents the deviation of the input signal from the reference signal. The input signal is associated with the sampled instantaneous value; and d) circuitry for providing a low-pass filtered first indication signal to the input, whenever the deviation, of the output signal, of the sampling circuitry, from the reference signal, does not exceed a predetermined value. Otherwise (i.e., whenever the deviation exceeds the predetermined value), a second indication signal is provided to the amplifier circuitry. The second indication signal is related to higher deviation values.

Preferably, the APFC further comprises:

a) non-linear filtration circuitry, for non-linear processing of the output signal of the sampling circuitry. The non-linear filtration circuitry has first and second modes of operation. The first mode of operation utilizes a first time constant ($\tau_1$) and the second mode of operation utilizes a second constant ($\tau_2$). $\tau_2$ is smaller than $\tau_1$; and b) a 'window', or 'gap', circuitry for defining an upper and lower voltage boundaries, in relation to, and around, the output voltage of the non-linear filtration circuitry. The voltage boundaries determine whether the actual operating mode would be the first or the second mode of operation. The mode of operation is determined such that whenever the output of the sampling circuitry resides within the voltage boundaries, said non-linear filtration circuitry operates in said first mode, and, whenever the output of said sampling circuitry is lower/higher than said lower/higher voltage boundaries, respectively, said non-linear filtration circuitry operates in said second mode.

The non-linear filtration circuitry may further comprise:
a) a resistor, a first contact of which being coupled to the input of the amplifier circuitry, and a second contact being coupled to the output of the sampling circuitry;
b) a capacitor, a first contact of which being coupled to a signal ground and a second contact being coupled to the input of said amplifier circuitry and to said first contact of said resistor; and
c) a bypass circuitry, said bypass circuitry being placed in parallel in relation to said resistor, for allowing to change the time constant of said non-linear filtration circuitry from $\tau_1$ to $\tau_2$, whenever the output of the sampling circuitry exceeds the voltage boundaries, and maintaining time constant $\tau_1$ whenever the output of said sampling circuitry resides within said voltage boundaries.

The 'window' circuitry and the bypass circuitry may be implemented by utilizing two diodes, said diodes being connected in parallel to the resistor, and the anode of each one of said diodes being connected to the cathode of the other diode. Alternatively, the 'window' circuitry and the bypass circuitry may be implemented by utilizing two Zener diodes connected in series with respect to each other, and in parallel with respect to the resistor. According to one aspect, the two Zener diodes are connected such that the anode of one Zener diode is connected to the anode of the other Zener diode. According to another aspect, the two Zener diodes are connected such that the cathode of one Zener diode is connected to the cathode of the other Zener diode.

Alternatively, the 'window' circuitry and the bypass circuitry may be implemented by utilizing first and second transistors. The first transistor may be an 'n-p-n' type, and the second transistor may be a 'p-n-p' type transistor. The collector of the first transistor may be coupled to a power supply. The base of the first and of the second transistors may be coupled to the output contact of the sampling circuitry. The emitters of the first and of the second transistors may be coupled to the input contact of the amplifier circuitry, and the collector of the second transistor may be coupled to the signal ground. According to another aspect, a first Zener diode is coupled between the base of the first transistor and the output of the sampling circuitry, the anode of which is coupled to said base, and a second Zener diode is coupled between the base of the second transistor and said output of sampling circuitry, the cathode of which is coupled to said base.

Alternatively, the 'window' circuitry and the bypass circuitry may be implemented by utilizing a network consisting of first and second parallel branches, with respect to the resistor, each one of the branches consists a diode and a Zener diode, which are connected in series with respect to each other, such that current conduction is allowed in the Zener 'breakdown' direction, such that conduction for one voltage polarity across the network will cause conduction in one branch, and voltage in opposite direction will cause conduction in the other branch.

The nonlinear filtration circuitry and the window circuitry may be implemented by a digital controller, the tasks of which are sensing the instantaneous voltage at the output of the sampling circuitry, digitizing the sampled instantaneous voltage and digitally filtering, by utilizing, whenever required, the first time constant or the second time constant, and analyzing the digitized samples and filtering result, and delivering a corresponding signal to the input contact of the power switch, thereby causing said power switch to correct the output voltage of said apparatus. The digital controller may be realized by an Analog-to-Digital Converter (A/D) and a micro-controller.

The digital controller may be realized by Integrated Circuits (ICs). The term Integrated Circuit, which is sometimes called a chip or microchip, is a semiconductor wafer on which thousands or millions of tiny resistors, capacitors, and transistors are fabricated. An IC can function as an amplifier, oscillator, timer, counter, computer memory, or microprocessor. A particular IC is categorized as either linear (analog) or digital, depending on its intended application.

Preferably, the output signal of the digital controller remains unchanged as long as the signal at the output of the sampling circuitry remains within the voltage boundaries.

Preferably, the time constant of the digital filter is the first time constant whenever the signal at the output of the sampling circuitry is within the voltage boundaries, and is the second time constant whenever the signal at the output of the sampling circuitry is outside the voltage boundaries.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF PREFERRED EMBODIMENTS

Figure 4:
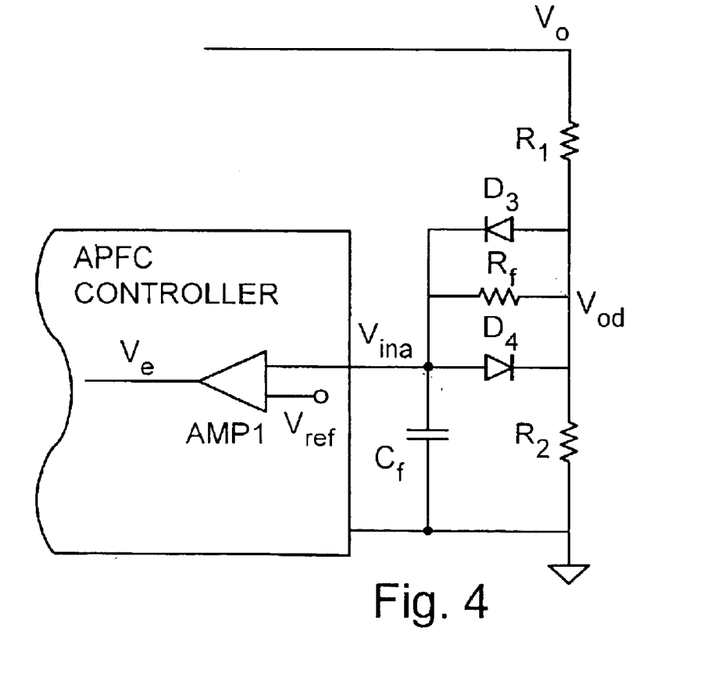
FIG. 4 illustrates a two-diode feedback-based circuitry implementation, according to a first embodiment of the invention.
Figure 5:
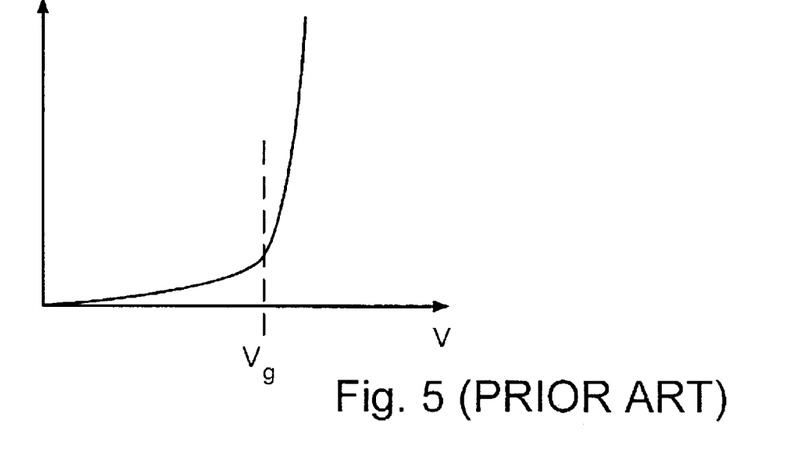
FIG. 5 illustrates a typical I-V characteristic of a semiconductor diode (prior art)

FIG. 4 illustrates a two-diode implementation, according to a first embodiment of the invention. The non-liner circuit includes a voltage divider ($R_1$, $R_2$) a filter ($R_r$, $C_f$) and a pair of diodes ($D_3$, $D_4$). It is well known in the art, that a semiconductor diode is a non-linear element having the general I-V characteristic schematically shown in FIG. 5. $V_g$ (FIG. 5) is generally referred to as the 'conducting voltage' of the diode, below which the diode introduces a high dynamic resistance, and above which the diode introduces a low incremental resistance, a fact being reflected in a rapid rise in the diode current as the voltage across the diode increases. The I-V curve is essentially an exponential curve, and $V_g$ depends on the semiconductor technology used to fabricate the diode (e.g. silicon PN, Silicon Schottky, Germanium PN etc.). Due to the non-linear behavior of the I-V curve, the filtering effect of the circuit depends essentially on whether the voltage on diodes $D_3$ and D4 (FIG. 4) is below or above the corresponding $V_g$.

In FIG. 4, whenever none of diodes $D_3$ and $D_4$ is in its conducting state, the 'cut-off' frequency of the filter is:

$$f_o = \frac{1}{2\pi R_{eq1} C_f} \tag{13}$$

wherein:

$$R_{eq1} = R_f + \frac{R_1 R_2}{R_1 + R_2} \tag{14}$$

However, whenever one of diodes $D_3$ and $D_4$ is in its conducting state, the cut-off frequency is:

$$f_o = \frac{1}{2\pi R_{eq2} C_f} \tag{15}$$

wherein:

$$R_{eq2} = \frac{R_1 R_2}{R_1 + R_2} \tag{16}$$

In expression (16) the dynamic resistance of either diode $D_3$ or $D_4$ (i.e. $R_d$, not shown) has been neglected, since in their conducting state it is assumed that condition (17) is met:

$$R_d < \frac{R_1 R_2}{R_1 + R_2} \tag{17}$$

The network, therefore, has two time constants (i.e. $R_{eq1} C_f$ and $R_{eq2} C_f$) that correspond to two 'cut-off' frequencies of the filter. By choosing:

$$R_f > \frac{R_1 R_2}{R_1 + R_2} \tag{18}$$

and selecting a small capacitor $C_f$, a very high filtering effect is achieved when neither of diodes $D_3$ and $D_4$ is conducting, and a quick response whenever $V_o$ is outside a voltage 'window'/'gap'; namely, whenever diode $D_3$ or diode $D_4$ is conducting.

In order for $D_3$ to conduct $V_o$ has to increase by $\Delta V_{o+}$;

$$\Delta V_{o+} = V_g \frac{R_1 + R_2}{R_2} \tag{18}$$

Similarly, and assuming $D_4$ has the same $V_g$, in order for $D_4$ to conduct $V_o$ has to decrease by $\Delta V_{o-}$;

$$\Delta V_{o-} = V_g \frac{R_1 + R_2}{R_2} \tag{19}$$

Consequently, the circuitry depicted in FIG. 4 provides a voltage window/gap, the width of which is $\Delta V_o$:

$$\Delta V_o = 2 V_g \frac{R_1 + R_2}{R_2} \tag{20}$$

At steady state (assuming a high-gain amplifier AMP1, FIG. 4):

$$V_{ref} \approx V_o \frac{R_2}{R_1 + R_2} \tag{21}$$

therefore:

$$V_o \approx V_{ref} \frac{R_1 + R_2}{R_2} \tag{22}$$

From (20) and (22) one obtains:

$$\frac{\Delta V_o}{V_o} \approx \frac{2 V_g}{V_{ref}} \tag{23}$$

which implies that the voltage window of output voltage $V_o$, for which a high degree of filtering is obtained, is approximately:

$$\Delta V_o \approx \frac{2 V_g}{V_{ref}} V_o \tag{24}$$

If $D_3$ and $D_4$ are, for example, silicone diodes, $V_g$=0.5V. Therefore, for a $V_{ref}$=5V, the output voltage window is ±10% of the nominal $V_o$. As long as the output voltage remains within this voltage window, the output of the voltage error amplifier $V_e$, will have a low ripple content due to the heavy filtering resulting from the large resistance of $R_{eq1}$. Once the output voltage crosses one of the window boundaries/limits, one of the diodes will conduct and the deviation will be quickly delivered to the input of voltage error amplifier AMP1 (FIG. 4). Accordingly, the APFC controller will quickly correct the output voltage excursion, thereby obeying the principles of the invention; i.e., high filtering at steady state and a fast response to drastic changes in the load. The principle described hereinabove, according to which a filter is implemented by utilizing a non-linear circuitry, may be referred to as a 'conditional filtering', and the filter may be referred to as 'conditional filter'.

Figure 6:
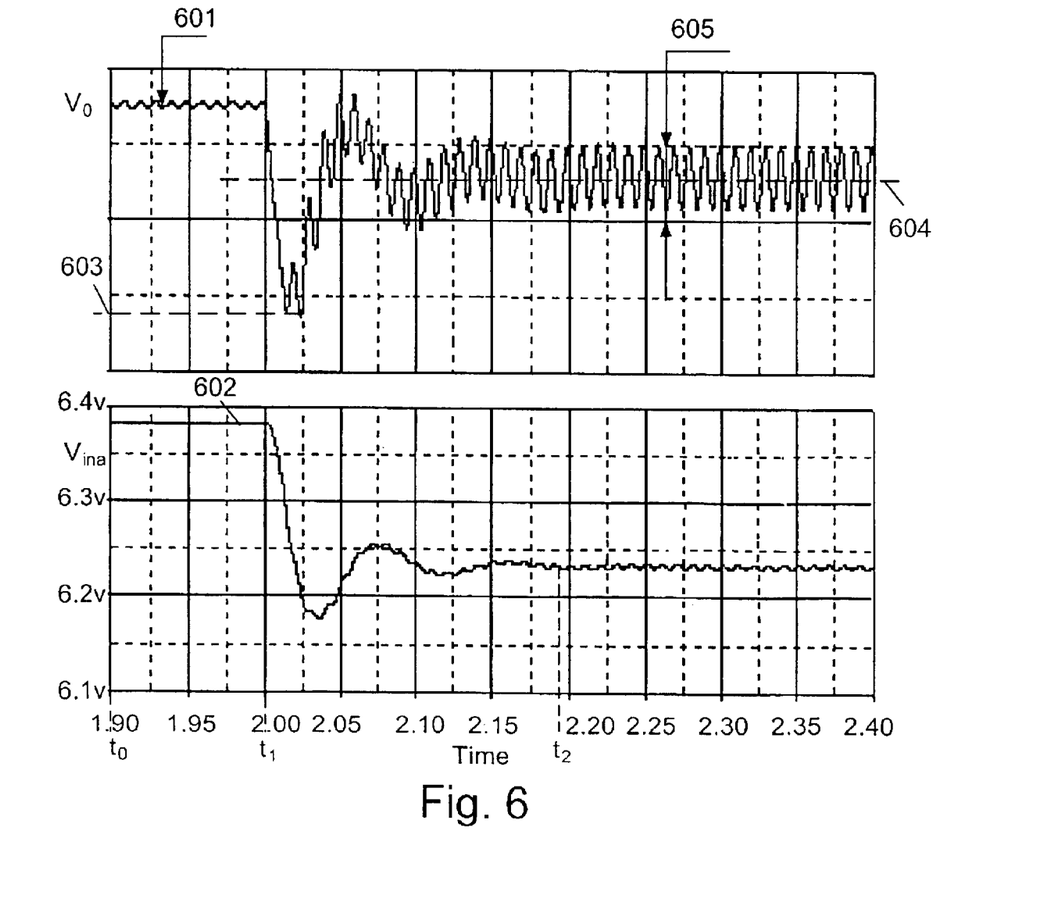
FIG. 6 illustrates simulation results of the performance of APFC utilizing non-linear network, according to a preferred embodiment of the invention.

FIG. 6, illustrates simulation results of a 'conditional filter' that is implemented according to the circuitry illustrated in FIG. 4. The simulation was carried out for the following parameters and components values: $R_1$=134 kΩ; $R_2$=2.2 kΩ; $C_f$=47μ; $R_f$=100 kΩ; $D_3$, $D_4$=BAS70; $V_o$=380V; Gain of AMP1=33.

Between instant $t_0$ and $t_1$ there is no changing in load $R_L$ (FIG. 3). Therefore, the average value of $V_o$ is kept steady (601) and within permissible voltage boundaries (not shown). Accordingly, $V_{ina}$ is 'heavily' filtered, thereby producing a nearly Direct Current (DC) voltage 602. At instant $t_1$ there is an abrupt change in $R_L$ (i.e. the load is increased) that causes $V_o$ to undershoot to level 603, which is fur below the required average voltage 601 (i.e. the change in $V_o$ exceeds the permissible voltage boundaries—not shown). Theoretically, the converter output voltage should have regained magnitude 601. However, in the converter, the practical behavior of which has been simulated, the average output voltage $V_o$ decreased to 604, which is tolerable. The time that elapses between instant $t_1$ and $t_2$ is a transient time, during which a 'light' filtering (i.e. small time-constant) takes place, so as to allow the error amplifier contained in the APFC converter (not shown) to quickly respond to the drastic change in $V_o$. Consequently, $V_o$ enters its steady state in relatively short period, after which it stabilizes at an average voltage level 604.

Voltage level 604 is lower than 601 and ripple 605 is larger than the ripple of 601 due to the increase in the current drawn by the (increased) load.

Figure 7:
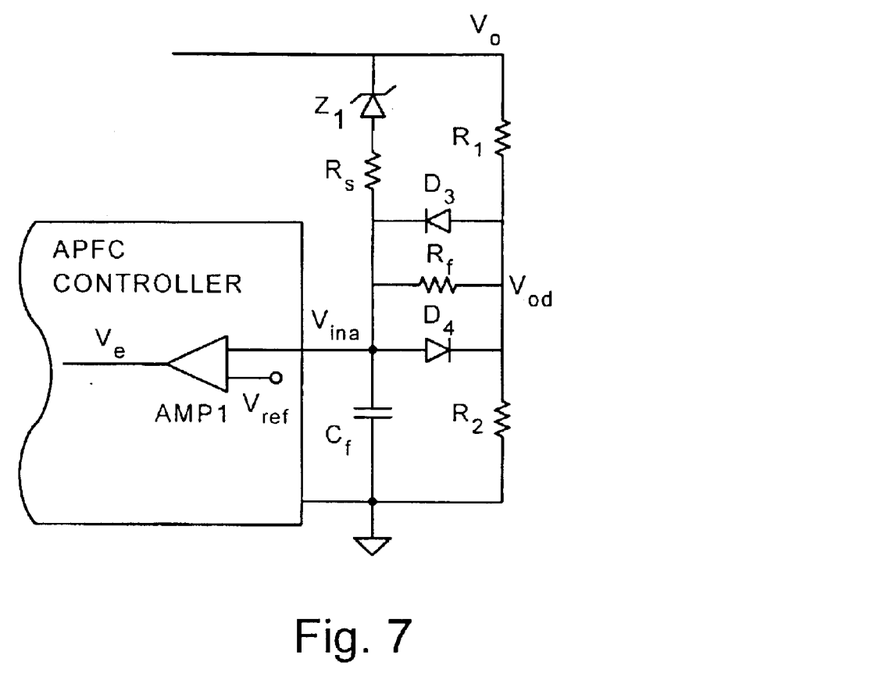
FIG. 7 illustrates a two-diode plus zener diode implementation of a feedback circuitry, according to a second embodiment of the invention.

The performance of the APFC illustrated in FIG. 4 is improved (i.e. the permissible upper boundary of the output voltage being extended) by adding a zener diode, as illustrated in FIG. 7.

In FIG. 7, zener diode $Z_1$, having breakdown voltage $V_Z$ and in series with resistor $R_s$ is connected between the output voltage $V_o$ and the input of voltage error amplifier AMP1. The breakdown voltage of the zener diode is chosen so that it will conduct whenever the output voltage dangerously reaches a high level. $R_s$ is a resistor having a small value, and it is used primarily to limit the current flowing through the zener diode and, thus, to protect it from being damaged. Consequently, when the output voltage is higher than ($V_{ref}+V_Z$) capacitor $C_f$ will charge rapidly, thus enabling the controller to respond quickly. Adding the zener diode, as described hereinabove, provides an extra protection to the load by avoiding dangerous output voltage.

In order to allow the feedback network to quickly respond to drastic output changes, the filter capacitor needs to have relatively small capacitance. However, this could deteriorate the performance of the switched-mode converter, since the large interfering noise, which cannot be totally avoided in these systems, may generate considerable spikes on such capacitor and, therefore, may cause the APFC to malfunction. This problem is solved in the circuitry illustrated in FIG. 8.

Figure 8:
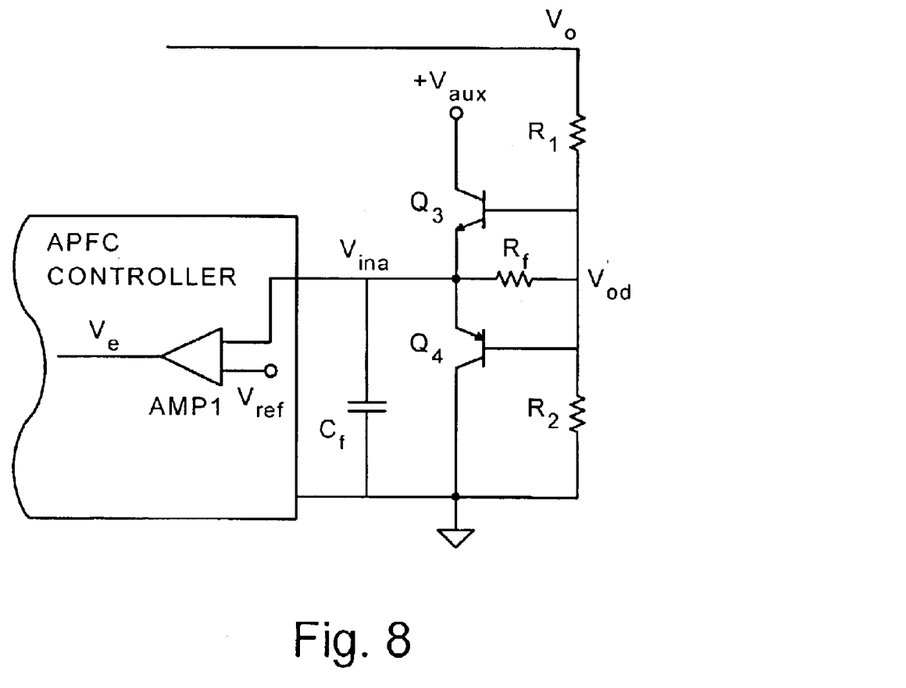
FIG. 8 illustrates a two-transistor implementation of a feedback circuitry, according to a third embodiment of the invention.

In FIG. 8, two transistors (i.e. $Q_3$ and $Q_4$) provide extra drive current to quickly charge and discharge $C_f$. $C_f$ is, therefore, allowed to be of a larger capacitance, which improves the immunity of the circuit as a whole to spikes. The operation of this 'conditional filter' is similar to the operation of the diodes case (FIG. 4), except that a much larger current is available for charging capacitor $C_f$, due to the gain of the transistors. If the bulk capacitor $C_o$ (not shown) is chosen to be of relatively small value, the ripple at output voltage $V_o$ will be large. In such a case the voltage window/gap of the feedback network needs to be extended. A solution to this problem is illustrated in FIG. 9.

Figure 9:
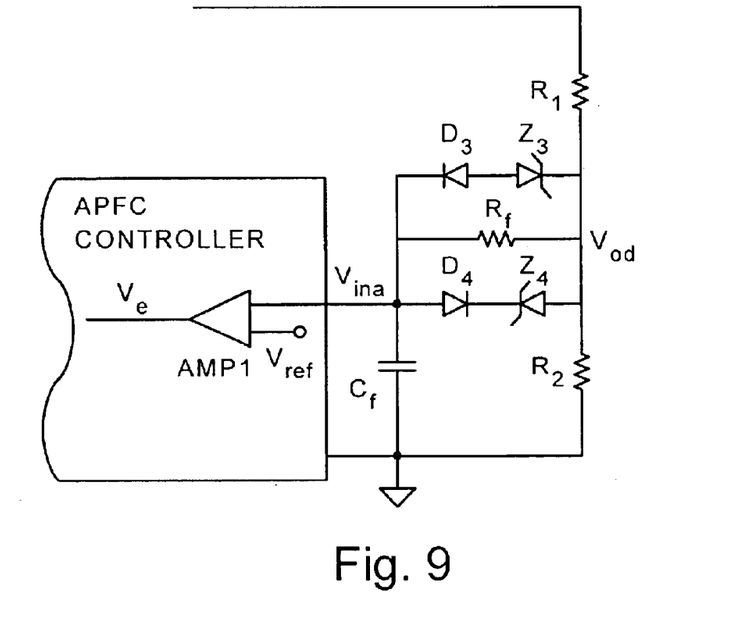
FIG. 9 illustrates a combination of two-diode plus two zener diode implementation of a feedback circuitry, according to a forth embodiment of the invention.
Figure 10:
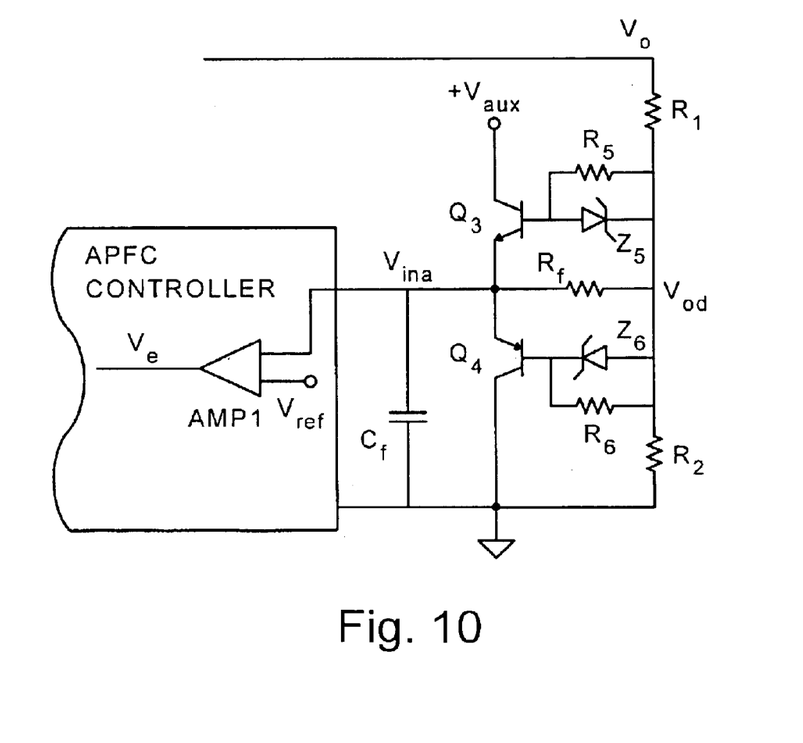
FIG. 10 illustrates a combination of two-transistor plus two zener diodes implementation of a feedback circuitry, according to a fifth embodiment of the invention.

In FIG. 9, the wider window is obtained by adding zener diodes $Z_3$ and $Z_4$ in series with diodes $D_3$ and $D_4$, respectively. Diodes $D_3$ and $D_4$ are still required since the zener diodes are also characterized in having diode characteristic in the forward (i.e. conduction) direction. When transistors are used, basically in the same manner as illustrated in FIG. 8, the zener diodes can also be added in order to extend the voltage window, as illustrated in FIG. 10.

Figure 11:
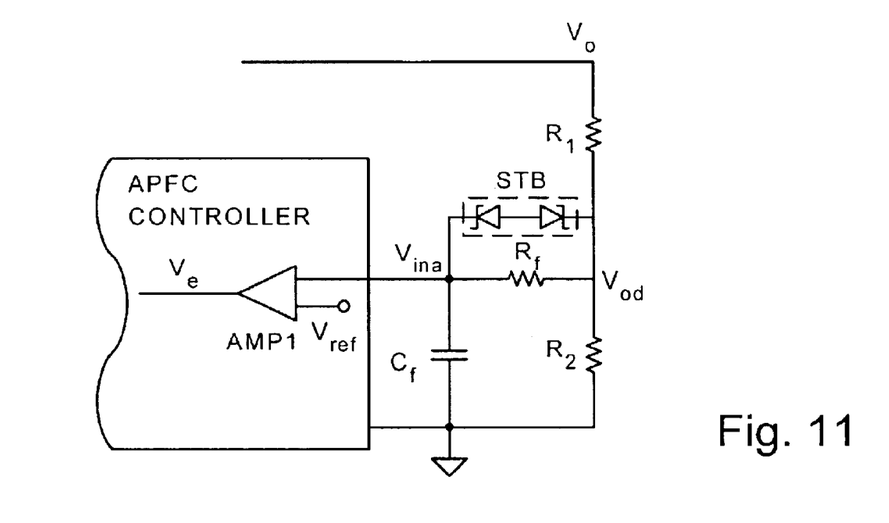
FIG. 11 illustrates a back-to-back (bilateral) zener diodes implementation of a feedback circuitry, according to a sixth embodiment of invention.

Instead of using back to back connected diodes, or silicon diodes plus zener diodes, a bilateral zener device might be utilized for simplifying the construction, as illustrated in FIG. 11.

One practical problem that may deteriorate the performance of an APFC system is the interference caused by spikes that are typical to a switch mode system. Spikes may falsely trigger the (error) comparators used in the analog implementation of APFC system, as described hereinabove. This problem is overcome by replacing the analog control circuitry with a digital controller, as depicted in FIG. 12.

Figure 12:
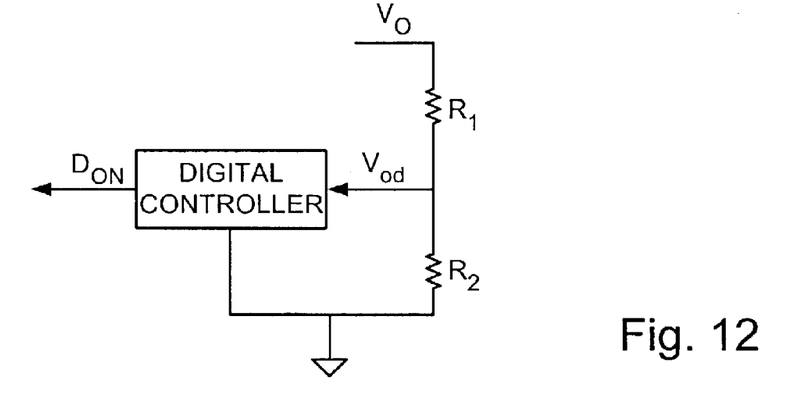
FIG. 12 schematically illustrates a Digital Controller-based implementation, according to a seventh embodiment of the invention.

In FIG. 12, the Digital Controller receives signals that are proportional to the input current (not shown) and output voltage $V_o$, and generates the gate signals $D_{ON}$ for the switch $Q_1$ (not shown). The digital controller employs an algorithm that emulates the operation of the analog APFC control scheme described hereinabove. The digital controller might be implemented, for example, by utilizing a microcontroller and an Analog-to-Digital Converter (ADC), as depicted in FIG. 13.

Figure 13:
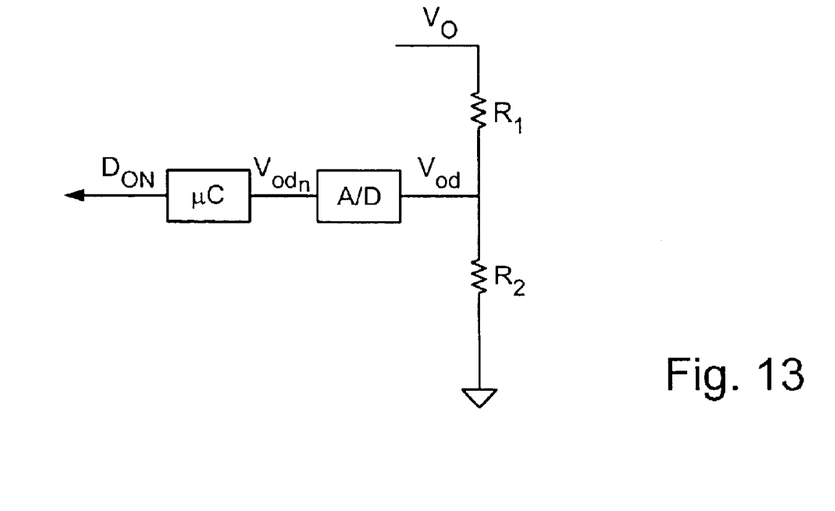
FIG. 13 illustrates one embodiment of the Digital Controller-based implementation shown in FIG. 12.

In FIG. 13, digitizing the $V_{od}$ is carried-out by an ADC, which generates a digital signal $Vod_n$ by sampling $V_{od}$ every T seconds. The microcontroller μC employs an algorithm in the form of a software code, for processing digital signal $Vod_n$, thus implementing the proposed non-linear behavior of the feedback loop described above. One exemplary realization of such an algorithm is suggested in the flow chart illustrated in FIG. 14.

Figure 14:
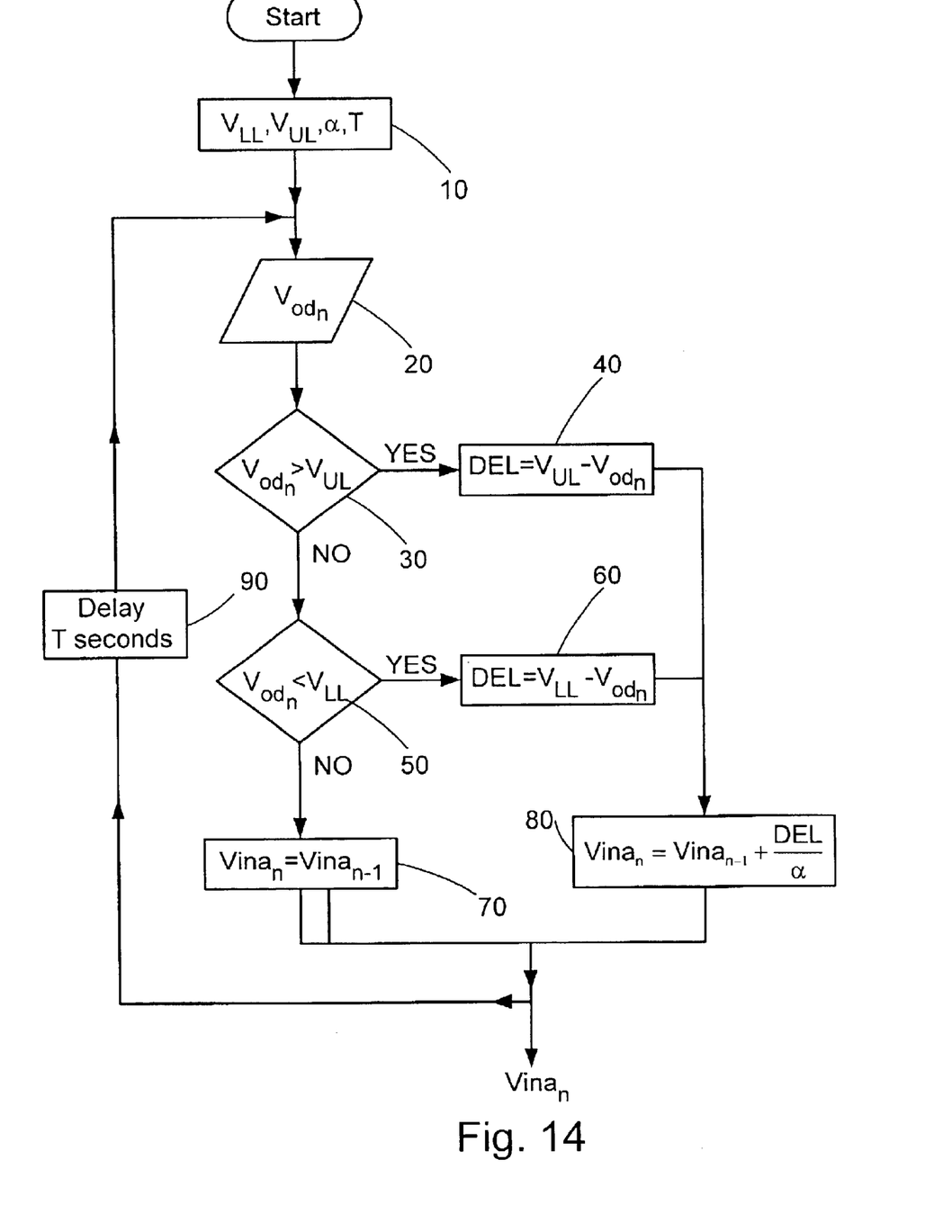
FIG. 14 is a first software algorithm to be employed by the Digital Controller shown in FIG. 12.

FIG. 14 illustrates a first software algorithm, whereby the error signal $Vina_n$, changes only in cases wherein the APFC output voltage exceeds the permissible voltage window/gap/boundary limits. In FIG. 14, $V_{UL}$ is the upper limit and $V_{LL}$ is the lower limit of the output voltage (attenuated by voltage divider $R_1$, $R_2$: FIG. 13). T is the sampling time and □ is feedback time constant (block 10). The software accepts the digitized value $Vod_n$ as the input data (block 20). If $Vod_n$ is larger (block 30) then upper limit $V_{UL}$, the difference DEL between the the upper limit and the sample value is obtained (block 40). If, however $Vod_n$ is smaller (block 50) then the lower limit $V_{LL}$, the difference DEL between the lower limit and said $Vod_n$ (block 60) is obtained. The resulting value DEL is then filtered out by block 80 to obtain the (current) signal $Vina_n$, which corresponds to the analog signal $V_{ina}$ that is fed to the PWM circuitry (FIG. 3), the output signal of which drives the power switch ((FIG. 3: $Q_1$). Should $Vod_n$ remains within the predefined limits $V_{LL}$ and $V_{UL}$ ('NO' branch of the block 50), the value of $Vina_n$ remains unchanged (block 70). That is, the signal $Vina_n$ remains constant as long as the APFC output voltage remains within the normal operation range (i.e. within the predetermined limits of the voltage window).

Figure 15:
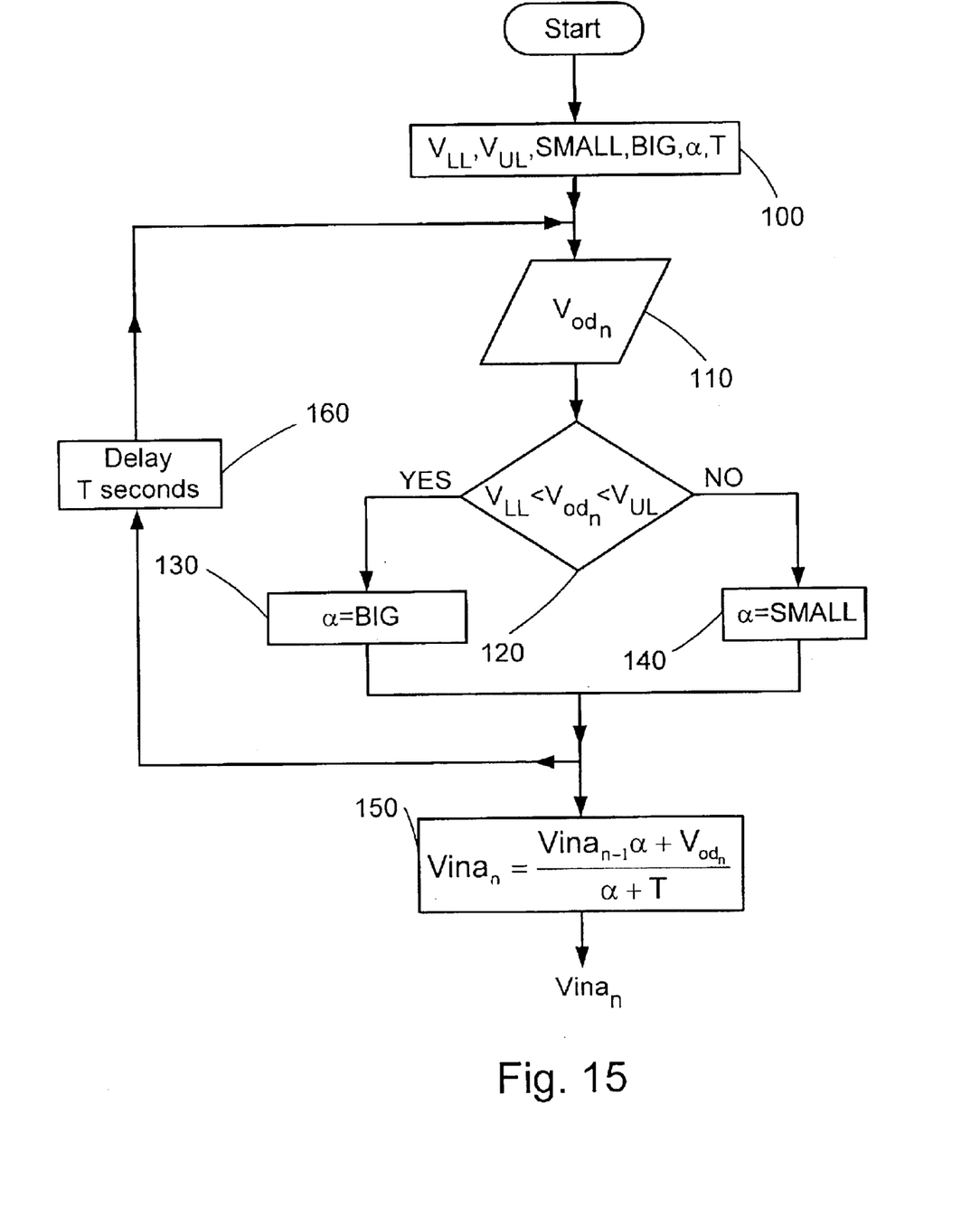
FIG. 15 is a second software algorithm to be employed by the Digital Controller shown in FIG. 12.

FIG. 15 illustrates a second software algorithm, whereby the error signal $Vina_n$ is allowed to change abruptly in cases wherein the APFC output voltage exceeds the permissible voltage window/gap/boundary limits, and to change only 'lightly' as long as the APFC output voltage remains within the permissible limits. The basic constants and variables (block 100) are defined and a voltage representative of the APFC output voltage is sampled (110). The controller software checks whether the APFC output voltage exceeds the predetermined window limits, as schematically described in block 120. Like in the analog case (see, for example, the circuit in FIG. 4), whenever the APFC output voltage remains within the predetermined window limits ('YES' branch on the flow chart), the feedback time constant α will be assigned a very large value (block 130). A large α will minimize the distortion of the input current when the system is in steady state. Otherwise, the algorithm will initiate a fast control signal by assigning a very low value to α. The parameter α is the time constant of the digital filter 150 used to filter $Vod_n$ to obtain the signal $Vina_n$.

An additional advantage of the digital implementation is that it can be easily and practically built as a microelectronics circuit. Furthermore, since the comparators are digital, they are more immune to false triggering by noise.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

What is claimed is:

1. An Active Power Factor Correction (APFC) apparatus having improved output voltage regulation, for switching a power supply fed by an array of rectifying diodes and consisting of at least an input inductor, a contact of which is connected in series with a contact of said array, and of a controllable power switch connected in tandem with said array and said input inductor, comprising:
   a) sampling circuitry, for sampling the instantaneous value of the output voltage;
   b) control circuitry, for controlling the switching time of said controllable switch in response to an error signal, and, thereby, causing said instantaneous value to be essentially similar to a predetermined nominal value;
   c) amplifier circuitry, for generating said error signal, said amplifier circuitry having at least a reference input connected to a reference signal, being determined according to said nominal value and sampling circuitry, and an input, to which an input signal is provided, said error signal represents the deviation of said input signal from said reference signal, said input signal being associated with the sampled instantaneous value; and
   d) circuitry for providing a low-pass filtered first indication signal to said input, whenever the deviation, of the output signal, of said sampling circuitry, from said reference signal, does not exceed a predetermined value, or otherwise, for providing a second indication signal to said amplifier circuitry whenever said deviation exceeds said predetermined value, said second indication signal being related to higher deviation values.

2. Apparatus according to claim 1, further comprising:
   a) non-linear filtration circuitry, for non-linear processing of the output signal of the sampling circuitry, said non-linear filtration circuitry having first and second modes of operation, said first mode utilizing a first time constant ($\tau_1$) and said second mode utilizing a second constant ($\tau_2$), $\tau_2$ being smaller than $\tau_1$; and
   b) circuitry for defining a voltage window having an upper and lower voltage boundaries around an output voltage of said non-linear filtration circuitry, said output voltage being related to the predetermined nominal value, said boundaries determining the actual operating mode, being selected from said first and second modes of operation, such that whenever the output of the sampling circuitry resides within said voltage boundaries, said non-linear filtration circuitry operates in said first mode, and, whenever the output of said sampling circuitry is lower/higher than said lower/higher voltage boundaries, respectively, said non-linear filtration circuitry operates in said second mode.

3. Apparatus according to claim 2, wherein the non-linear filtration circuitry further comprising:
   a) a resistor, a first contact of which being coupled to the input of the amplifier circuitry, and a second contact being coupled to the output of the sampling circuitry;
   b) a capacitor, a first contact of which being coupled to a signal ground and a second contact being coupled to the input of said amplifier circuitry and to said first contact of said resistor; and
   c) a bypass circuitry, said bypass circuitry being connected in parallel to said resistor, for allowing changing the time constant of said non-linear filtration circuitry from $\tau_1$ to $\tau_2$, whenever the output of the sampling circuitry exceeds the voltage boundaries, and maintaining time constant $\tau_1$ whenever the output of said sampling circuitry resides within said voltage boundaries.

4. Apparatus according to claims 2 and 3, wherein the circuitry for defining the voltage window and the bypass circuitry are implemented by utilizing two diodes, said diodes being connected in parallel to the resistor, and the anode of each one of said diodes being connected to the cathode of the other diode.

5. Apparatus according to claims 2 and 3, wherein the circuitry for defining the voltage window and the bypass circuitry are implemented by utilizing two Zener diodes connected in series with respect to each other, and in parallel with respect to the resistor.

6. Apparatus according to claims 2 and 3, wherein the circuitry for defining the voltage window and the bypass circuitry are implemented by utilizing first and second transistors, said first transistor being an 'n-p-n' type, and said second transistor being a 'p-n-p' type transistor, the collector of said first transistor being coupled to a power supply, the base of said first and second transistors being coupled to the output contact of the sampling circuitry, the emitters of said first and second transistors being coupled to the input contact of the amplifier circuitry, and the collector of said second transistor being coupled to the signal ground.

7. Apparatus according to claim 3, wherein the circuitry for defining the voltage window and the bypass circuitry are implemented by utilizing a network consisting of first and second parallel branches, with respect to the resistor, each one of said branches consists a diode and a Zener diode, which are connected in series with respect to each other, such that current conduction is allowed in the Zener 'breakdown' direction, such that conduction for one voltage polarity across said network will cause conduction in one branch, and voltage in opposite direction will cause conduction in the other branch.

8. Apparatus according to claim 6, in which a first Zener diode is coupled between the base of the first transistor and the output of the sampling circuitry, the anode of which is coupled to said base, and a second Zener diode is coupled between the base of the second transistor and said output of sampling circuitry, the cathode of which is coupled to said base.

9. Apparatus according to claim 2, in which the nonlinear filtration circuitry and the circuitry for defining the voltage window are implemented by a digital controller, the tasks of which are sensing the instantaneous voltage at the output of the sampling circuitry, digitizing the sampled instantaneous voltage and digitally filtering, by utilizing, whenever required, the first time constant or the second time constant, and analyzing the digitized samples and filtering result, and delivering a corresponding signal to the input contact of the power switch, thereby causing said power switch to correct the output voltage of said apparatus.

10. Apparatus according to claim 9, in which the digital controller is realized by an Analog-to-Digital Converter (A/D) and a micro-controller.

11. Apparatus according to claims 9 or 10, in which the digital controller is realized by Integrated Circuits (ICs).

12. Apparatus according to claims 3 and 9, in which the output signal of the digital controller remains unchanged as long as the signal at the output of the sampling circuitry remains within the voltage boundaries.

13. Apparatus according to claims 3 and 9, in which the time constant of the digital filter is the first time constant whenever the signal at the output of the sampling circuitry is within the voltage boundaries, and is the second time constant whenever the signal at the output of the sampling circuitry is outside the voltage boundaries.

14. Apparatus according to claim 5, wherein the two Zener diodes are connected such that an anode of one Zener diode is connected to the anode of the other Zener diode.

15. Apparatus according to claim 5, wherein the two Zener diodes are connected such that the cathode of one Zener diode is connected to the cathode of the other Zener diode.

* * * * *